United States Patent

Matsumiya et al.

[11] Patent Number: 5,813,817
[45] Date of Patent: Sep. 29, 1998

[54] CARRYING DEVICE AND CARRYING METHOD

[75] Inventors: Takeshi Matsumiya; Hiroshi Takabayashi, both of Kanagawa, Japan

[73] Assignee: Fuji Photo Film Co., Ltd., Kanagawa, Japan

[21] Appl. No.: 731,002

[22] Filed: Oct. 9, 1996

[30] Foreign Application Priority Data

Oct. 9, 1995 [JP] Japan .................................. 7-286374
Oct. 9, 1995 [JP] Japan .................................. 7-286375
Oct. 9, 1995 [JP] Japan .................................. 7-286376

[51] Int. Cl.[6] ............................................. B65G 1/04
[52] U.S. Cl. ................. 414/280; 364/478.06; 901/16; 414/753; 414/807; 414/273; 360/92
[58] Field of Search ............................. 414/222, 807, 414/331, 273, 277, 281, 275, 282, 286, 749, 751, 753, 274; 364/478.01, 478.02, 478.03, 478.06; 901/16; 360/92; 369/178

[56] References Cited

U.S. PATENT DOCUMENTS

| | | | |
|---|---|---|---|
| 3,715,040 | 2/1973 | Polus et al. | 414/280 X |
| 4,734,005 | 3/1988 | Blumberg | 414/280 X |
| 4,757,401 | 7/1988 | Teranishi | 414/280 X |
| 5,139,384 | 8/1992 | Tuttobene | 414/280 X |
| 5,146,375 | 9/1992 | Satoh et al. | 360/92 |
| 5,220,548 | 6/1993 | Nakatsukasa et al. | 414/280 X |
| 5,285,335 | 2/1994 | Sato | 360/92 |
| 5,418,664 | 5/1995 | Ostwald | 360/92 |
| 5,419,410 | 5/1995 | Yanagisawa | 186/49 |
| 5,622,470 | 4/1997 | Schaefer et al. | 414/280 X |

FOREIGN PATENT DOCUMENTS

| | | | |
|---|---|---|---|
| 205229 | 9/1991 | Japan | 414/280 |
| WO 94/08337 | 4/1994 | WIPO . | |

Primary Examiner—Frank E. Werner
Attorney, Agent, or Firm—Sughrue, Mion, Zinn, Macpeak & Seas, PLLC

[57] ABSTRACT

There are provided carrying device and method capable of high-speed pick-up and travelling operation of a carrier. The carrier is provided with a holder bracket movable back and forth, in which claw members for grasping a material are held, and a driver mechanism for stroking g the holder bracket and a driver mechanism for opening and closing the claw members are attached to the carrier body. A movable portion in the carrier can be made lighter in weight. An electric wiring cord to be connected to the movable portion can be eliminated or made thin and light enough. This allows the carrier to move at a high speed. The carrier is held at the intersection of a pair of crossing moving bars and moved to a target position by moving both the moving bars. No motor needs to be provided in the carrier for driving the carrier, so that the movable portion moving together with the carrier can be made lighter in weight, thereby speeding up the movement of the carrier. The exchange of control signals between the carrier and carrying controller is made by serial communication, preferably, wireless or optical communication. Also provided is a control method for stopping the carrying operation by detecting a material which projects from the shelves.

5 Claims, 16 Drawing Sheets

CARRYING DEVICE AND CARRYING METHOD

BACKGROUND OF THE INVENTION

1. Field of the Invention

The present invention relates to a carrying device and a carrying method by which a target material or an item, such as a microfilm cartridge, is pulled or taken out from one of storage shelves, carried to a target position or station and carried back from the original or other position to the shelf. The present invention also relates to a control method for the carrying device.

2. Related Art

There are microfilm cartridge exchange devices in the art, designed to selectively carry a target cartridge from one of shelves to a scanner, the shelves storing a large number of microfilm cartridges, so that the scanner can read a target image or images recorded on the microfilm in the target cartridge.

For example, one of such devices stores cartridges in the storage rack having a vertical flat or cylindrical shape so that the cartridge can be slid in and out from the front or outer face of the shelves of the storage rack and a carrying portion or a cartridge carrier moves in front of the shelves. The carrier moves to the front of a target cartridge to be put in the carrier. The carrier then carries or delivers the cartridge to another target position, e.g., to a scanner for retrieving and reading an image or images, so that the scanner executes predetermined processings such as retrieval and reading of the image. After the image or images recorded on the microfilm in the cartridge are processed, the carrier take out the read or processed cartridge from the scanner and return it to the original position in the shelves.

In this case, the carrier is provided with pick-up means for sliding or taking cartridges in and out. The pick-up means has claw or pawl members for grasping the cartridge which moves back and forth to the shelves. In the pick-up operation, the claw members moves forward from the carrier to one of the shelves or the scanner to hold a cartridge therebetween so that the cartridge within the shelf or the scanner can be put in the carrier. The claw members are also operative to send off the cartridge to the shelf or the scanner by pushing out the cartridge while holding it between the claws.

The claw members are held by a holder bracket, to which a driver mechanism (i.e., claw opening/closing drive means) such as a motor or solenoid is attached for opening and closing the claw members. The claw opening/closing drive means is configured to move unitarily with the holder bracket as the claw members moves back and forth.

In the conventional devices, since the claw opening/closing drive means moves back and forth together with the claw members, the movable portion in creases in weight and it is therefore difficult to speed up the movement. Further, the claw opening/closing drive means is generally constituted with an electric motor or an electromagnetic plunger. This requires electric wiring for controlling the claw opening/closing drive means to move as the claw members move because the claw opening/closing drive means is mounted on the movable portion. For this reason, a wiring cord or cords must be longer to increase the possibility of broken wire, resulting in obstruction to high-speed movement of the claw members.

Furthermore, the use of the shelves each having vertical flat shape causes other problems. In this case, the carrier needs to be moved in front of the shelves. In the conventional, the carrier is movably mounted on a horizontal or vertical bar movable in a direction perpendicular to the length side, and it is moved by a motor provided on the moving bar. For example, Unexamined Japanese Patent Publication (KOKAI) No. 38749/1992 discloses a mechanism in which a horizontal bar is moved vertically due to driving power of a moving-bar driving motor, and the carrier is moved horizontally by a motor provided on the horizontal bar.

Such a conventional device is required to mount the motor on the horizontal bar for moving the carrier horizontally over the moving bar, so that the movable portion integrally formed with the moving bar increases in weight. It is therefore needed to use a large and powerful motor for moving the horizontal bar up and down. Further, since the weight of the movable portion increases, the inertia exerted to move the carrier to a target position increases. This also causes the carrier to take longer time (access time) to reach the target position.

Furthermore, the carrier is provided with the pick-up means for taking materials (cartridges) in and out, and this requires a power source for the pick-up means and wiring for supplying operation control signals. For example, the pick-up means includes an electric motor which moves the claw members back and forth to a cartridge, an electromagnetic solenoid which is used for opening or closing the claw members so that the cartridge can be grasped or removed from the claw members, and several types of sensors for detecting information such as the position of the claw members and whether there is a cartridge between the claws.

For this reason, the carrier needs to be connected to an electric power wire for the pick-up means and to control signal lines. Since the power wire is heavier than the control signal lines and the number of control signal lines increases, the whole wiring becomes weighty and therefore still another problem arises that an increased load is applied to the carrier at the moving time.

Particularly, since the carrier moves two-dimensionally in the X and Y directions along the vertical plane facing the front area of the storing shelves, the movement of the distributing wires for the carrier is made more complicated and complex as the movement of the carrier is accelerated. It is therefore difficult to move the wiring smoothly due to an increased weight. This also causes obstruction to high-speed movement of the carrier.

When a cartridge or cartridges are not put in place, e.g., when one or some of cartridges project from the shelves of the storage rack due to vibration on the shelves, if the carrier moves in front of the shelves, it will contact and be interfered with the projecting cartridge.

Although it is desirable to move the carrier at a high speed in terms of high-speed retrieval, the high-speed movement of the carrier increases the impact when the carrier strikes the projecting cartridge, and this may damage the carrier or the cartridge. It is therefore necessary to move the carrier at a speed adequate not to damage or ruin at all the cartridges even if the carrier strikes the projecting cartridge.

OBJECTS AND SUMMARY OF THE INVENTION

The present invention has been accomplished under the circumstances as aforementioned and is directed to improvements of a carrying device, a carrying method and a control method for the carrying device, capable of high-speed operation and movement of a carrier for sliding materials in and out from storing shelves, capable of speeding up operation for retrieving and picking up a target material from one of the shelves, and capable of high-speed carrying of the material to a target position.

Specifically, a first object of the present invention is to provide a carrying device which can reduce the weight of a movable portion to be moved back and forth within a carrier together with claw or grasping members, and keep a power-supply wiring cord for claw opening/closing drive means as short as possible to avoid any possibility of broken wire to the cord, thereby achieving high-speed movement of the claw members.

A second object of the present invention is to provide a carrying method which can reduce the weight of the movable portion and achieve less or no electric wiring of the carrier to speed up the movement thereof, thereby shortening access time to the target position.

A third object of the present invention is to provide a carrying device directly used for carrying out the above method.

A fourth object of the present invention is to provide a control method for a carrying device which allows the carrier to move at a high speed by preventing the carrier from colliding with one of materials such as cartridges at a high speed to avoid any damage to both the carrier and the material.

The first object of the present invention is attained by the provision of a carrying device having a carrier which pulls out and carries a target material from one of shelves to a target position, the shelves storing a plurality of materials, and which carries back the target material from the target position to the shelf, said carrier comprising:

(a) a guide rod fixed to a casing of said carrier in parallel to a direction to slide said target material in and out;

(b) pick-up means including,
  (1) a holder bracket slidably held by said guide rod,
  (2) a gripper having claw members for grasping the target material by opening and closing the claw members, said gripper means being held by said holder bracket, and
  (3) a push member one end of which is held by said holder bracket, said push member being movable to push said gripper so that said claw members can be opened to engage the target material or closed to remove the target material;

(c) a rail member provided in the casing of said carrier in parallel to said guide rod and horizontally movable in a direction nonparallel to that of said guide rod, on which one end of said push member is slid and pushed to open or close said claw members as the rail member moves;

(d) stroke driving means attached to the casing of said carrier for moving said holder bracket over said guide rod; and (e) claw opening/closing drive means attached to the casing of said carrier for moving said rail member horizontally in a direction nonparallel to that of said guide rod to open or close said claw members.

According to the present invention, the driver mechanism for moving and driving the pick-up means is provided on the body side of the carrier on the purpose of reducing the weight of the pick-up means itself, i.e., the movable portion within the carrier, which accesses the material to slide it in and out.

Several types of materials or items can be carried, such as a microfilm cartridge or cassette, a videotape cassette, a video disk, a compact disk, and a magtape cartridge.

The stroke driving means can be configured to couple the holder bracket to an endless belt stretched in parallel to the guide rod and one pulley of the endless belt can be rotated by an electric motor. The endless belt may be replaced by a wire. Further, the guide rod can be provided in the upper portion within the casing of the carrier, with the upper end of the holder bracket held slidably on the guide rod and the lower end engagedly put in a guide groove provided on the bottom of a material compartment within the carrier.

The compartment may be provided two or more to constitute a buffer station. For example, a buffer having a plurality of compartments is provided for storing a plurality of materials, the compartments arranged in parallel in a direction to intersect perpendicularly to the direction to slide the materials in and out so that the compartments can be moved or shifted in the arranged direction. The buffer can be switched or shifted in the condition that the holder bracket exits the compartment. In this case, a guide groove is formed on the bottom of each compartment of the buffer so that lateral swing of the holder bracket can be restricted by inserting the lower end of the holder bracket into the guide groove when the holder bracket moves in and out from the compartment.

The second object of the present invention is attained by the provision of a carrying method of sliding a target material in and out from one of shelves which stores a plurality of materials arranged on a plane, wherein: a carrier is held near the intersection of a pair of moving bars movable in directions, respectively, parallel to said plane, so that said carrier is movable along the moving bars in respective directions parallel to both moving bars to a target position by monitoring each moving amount of the moving bars; and pick-up means is provided in said carrier for sliding said materials in and out, with control signals for the pick-up means transmitted by serial communication.

The power for the pick-up means can be supplied from the moving bars through contacts or metallic rollers. The power source may be a battery built in the carrier. The serial communication may be carried out with a wired system, a wireless system using an AM or FM wave, or an optical communication system using beams of infrared light.

The third object of the present invention is attained by the provision of a carrying device for sliding a target material in and out from one of shelves which stores a plurality of materials arranged on a plane, comprising:

(a) a pair of moving bars nonparallel to each other and movable in directions, respectively, in parallel to said plane, with maintaining constant angles to each other;

(b) bar driving means for moving both the moving bars;

(c) a carrier positioned near the intersection of both moving bars and movable along the moving bars in respective directions parallel to both moving bars;

(d) pick-up means provided in said carrier for sliding said materials in and out; and (e) a controller provided separately from said carrier and for producing an instruction to allow said carrier to move to a target position while monitoring each moving amount of the moving bars, said controller exchanging control signals with said carrier using serial communication, the control signals instructing said pick-up means to slide said materials in and out.

The fourth object of the present invention is attained by the provision of a control method for a carrying device having a carrier which moves closely and opposite to shelves to slide a target material in and out from the shelves, the shelves storing a plurality of materials arranged in a vertical plane, wherein, before carrying operation of carrying the materials, it is confirmed that no material projects from the shelves, and if all the materials is not stored correctly in the shelves, a warning is given to discontinue the carrying operation.

The carrier can be moved at a low speed to detect the projecting or protruding material when an increased load on the carrier is detected due to the contact of the carrier with the material. For example, load current of the motor for moving the carrier can be monitored to detect the increase in load when the current rapidly increases.

A light beam may be also used to detect the projecting material. For example, a flat reflector is provided along one side of the storage rack containing the storing shelves, while a light-emitting element and a sensor are provided on the carrier. In such an arrangement, the carrier is moved along the opposite side of the shelves to emit the light beam from the light-emitting element. The light beam emitted from the carrier end is reflected by the reflector and the reflected light beam is detected by the sensor on the carrier.

BRIEF DESCRIPTION OF THE DRAWINGS

The above and other objects and advantages and further description will now be discussed in connection with the drawings, in which.

DETAILED DESCRIPTION OF THE PREFERRED EMBODIMENTS

General Structure of Carrying System

Figure 1:
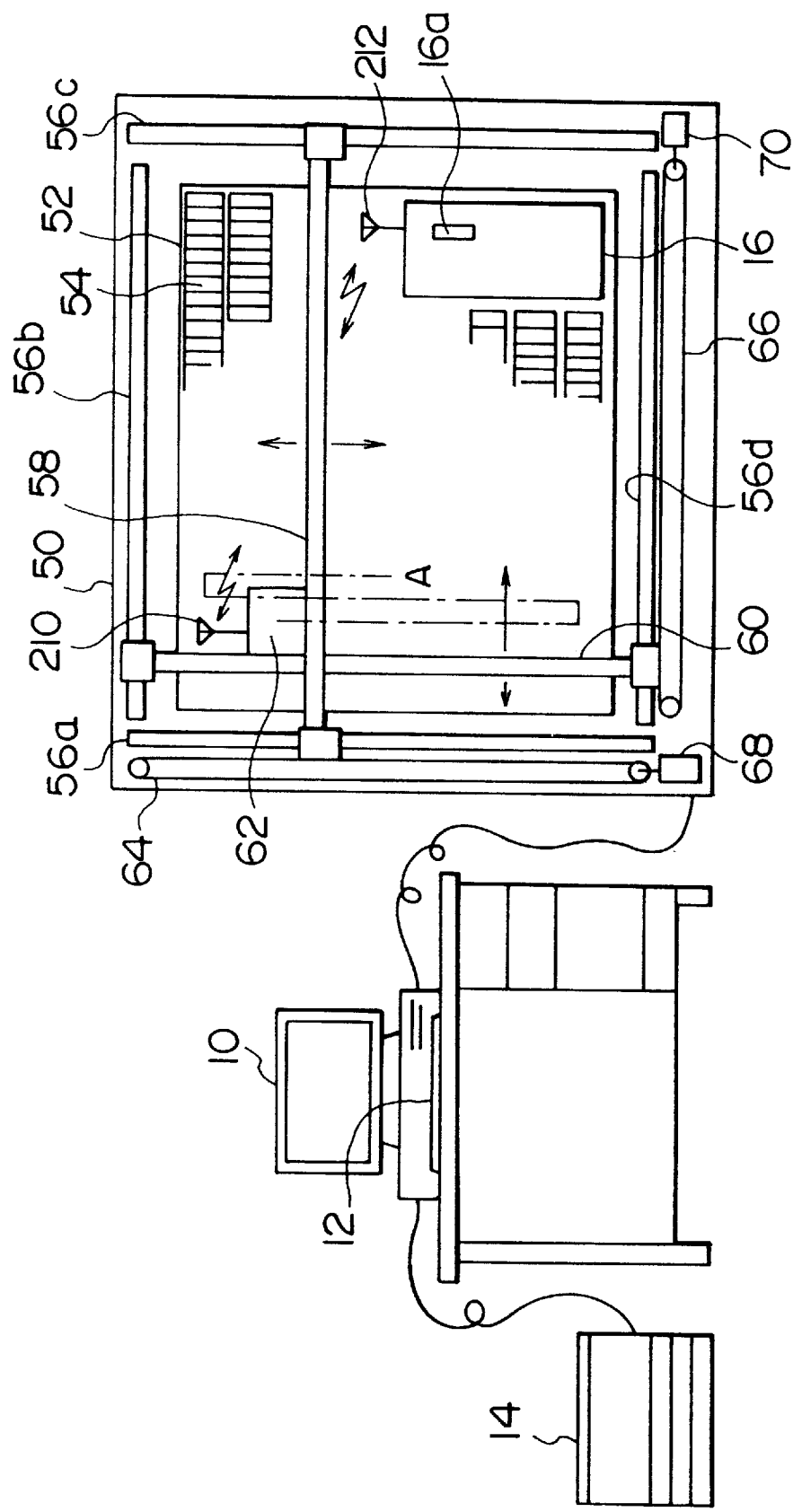
FIG. 1 is a schematic diagram showing a microfilm cartridge carrying system (cartridge storing and retrieving system) presently in use, which applies carrying device and method according to an embodiment of the present invention.
Figure 2:
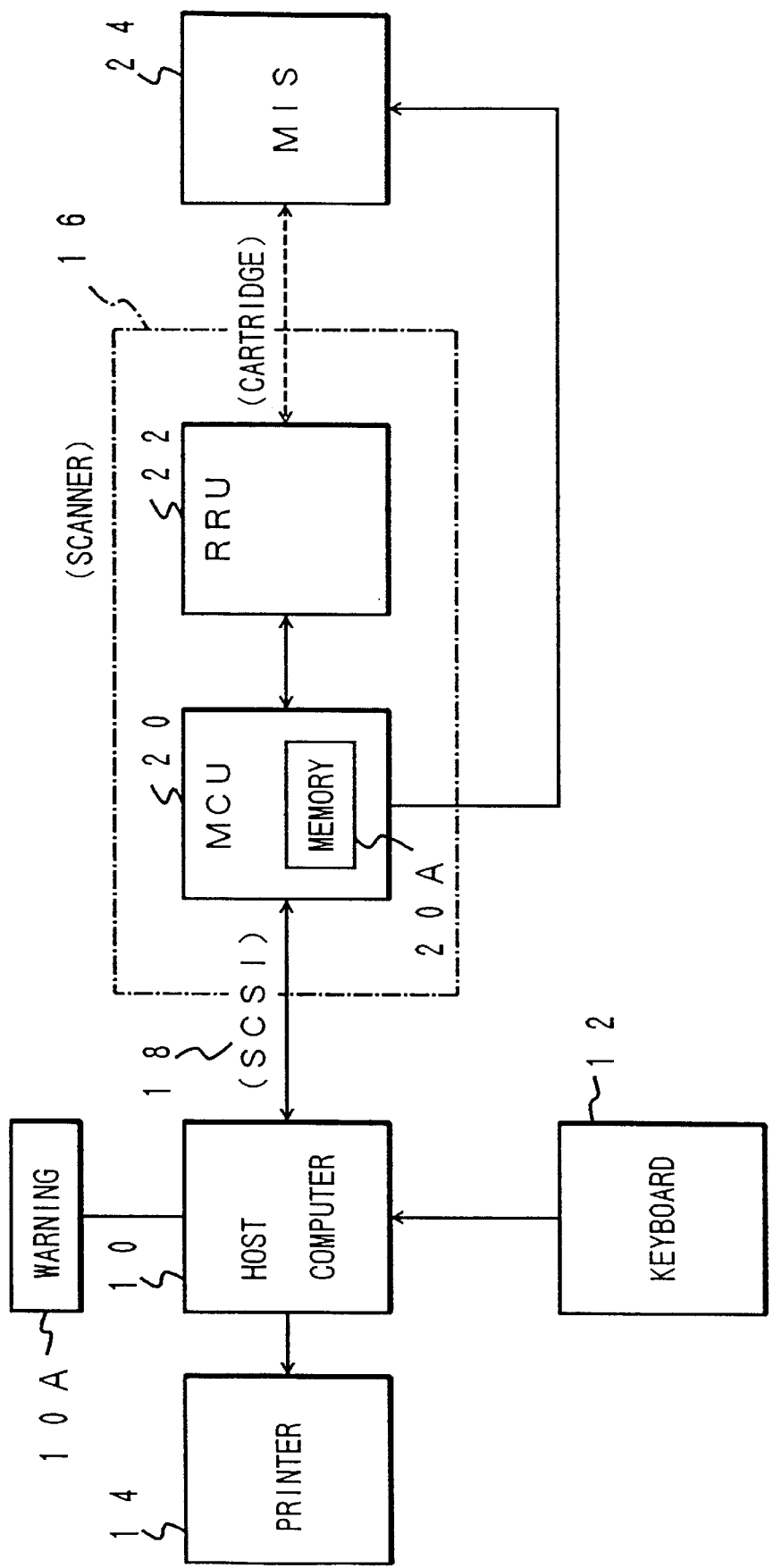
FIG. 2 is a block diagram showing a general structure of the cartridge storing and retrieving system in FIG. 1.

Referring to FIGS. 1 and 2, a reference numeral 10 denotes a host computer constituted with a personal computer or a work station. A key board 12 and a printer 14 are connected to the host computer 10. A reference numeral 16 is a scanner for retrieving a target frame recorded on a microfilm and reading (scanning) an image in the target frame. The scanner 16 is placed inside a MIS (Microfilm Install Unit) 24, which is described in detail hereinafter.

The scanner 16 is then connected to the host computer 10 through a bus (BUS) 18 in accordance with a SCSI standard. That is, the connection between the host computer 10 and scanner 16 is established by a SCSI interface. The scanner 16 includes a microfilm control unit (hereinafter, simply referred as MCU) 20 and a roll-film retrieval unit (hereinafter, also referred as RRU) 22.

The MCU 20 is provided with a microcomputer for controlling retrieval operation of the RRU 22 as well as for reading an image in a retrieved frame while moving a line sensor and storing image data of the read image in a memory 20A such as DRAM. The RRU 22 retrieves a desired frame while feeding a roll of microfilm.

The microfilm install system (MIS) 24 stores a large number of microfilm cartridges and selects a desired cartridge to load the RRU 22 of the scanner 16. The MIS 24 is controlled by the MCU 20. When the MCU 20 has specified a cartridge containing a target frame to be retrieved, if the cartridge is not being loaded into the RRU 22, the MCU 20 will actuate the MIS 24 to replace a cartridge currently loaded by the cartridge containing the target frame. The MCU 20 corresponds to a carrying controller according to the present invention.

Structure of Shelves

The MIS 24 has a rectangle case 50, and cartridge shelves 52 each having a vertical and flat shape configuration similar to a bookshelf are provided inside the case 50 for storing a large number of cartridges 54, so that a desired cartridge can be slid in and out from the front of a corresponding shelf 52. On the front face of the case 50, guide rails 56 (56a, 56b, 56c and 56d) are fixed along the four sides, where a horizontal moving bar 58 is guided along the opposite two guide rails 56a, 56c to move up and down, whereas a vertical moving bar 60 is guided along the opposite two guide rails 56b, 56d to move sideways.

These horizontal and vertical moving bars 58, 60 have a cross section of a shape like a letter "H", and move in vertical and lateral directions, respectively, with maintaining right angles to each other. A cartridge carrier 62 is slidably attached to the bars 58, 60 at the intersection of the two bars 58, 60. The horizontal moving bar 58 is fixed to a belt 64 tightly wound around a pair of pulleys located near the both ends of the guide rail 56a, whereas the vertical moving bar 60 is fixed to a belt 66 tightly wound around a pair of pulleys located near the both ends of the guide rail 56d. The belts 64, 66 are moved and positioned by motors 68, 70, respectively, each motor 68, 70 coupled to a corresponding pulley.

Figure 3:
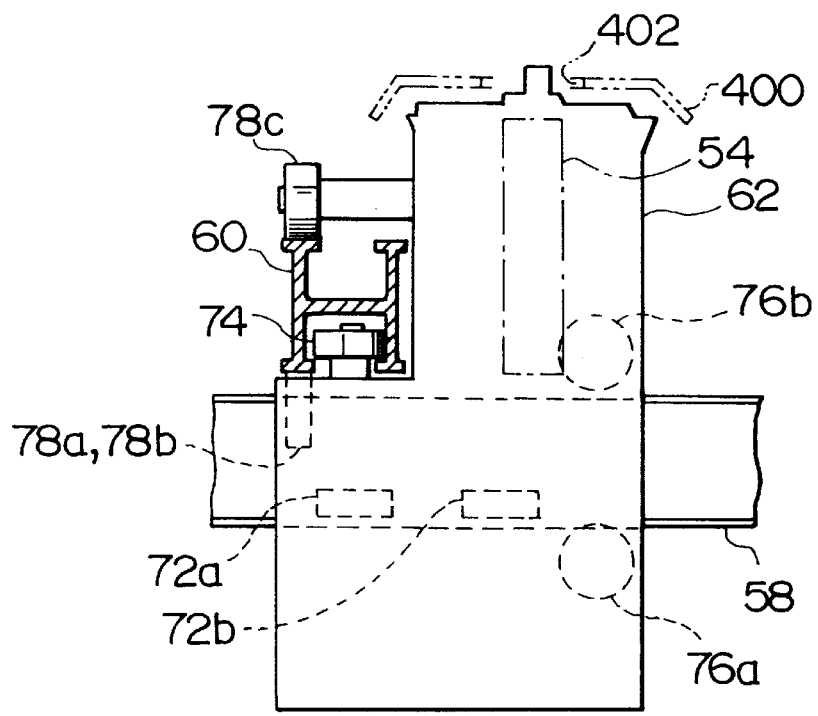
FIG. 3 is a plan view of a carrier used in the carrying system in FIG. 1.
Figure 4:
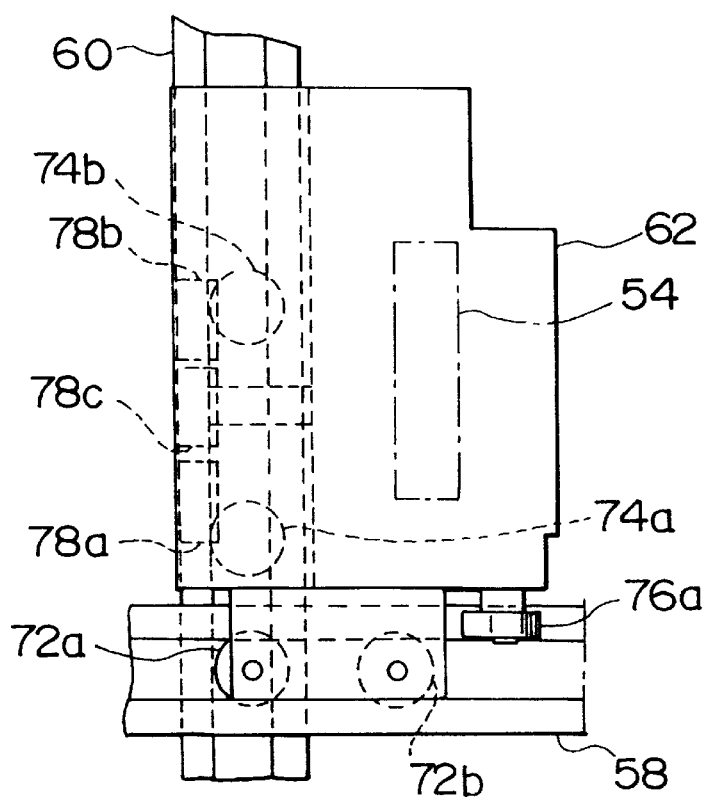
FIG. 4 is a front view of the carrier in FIG. 3.
Figure 5:
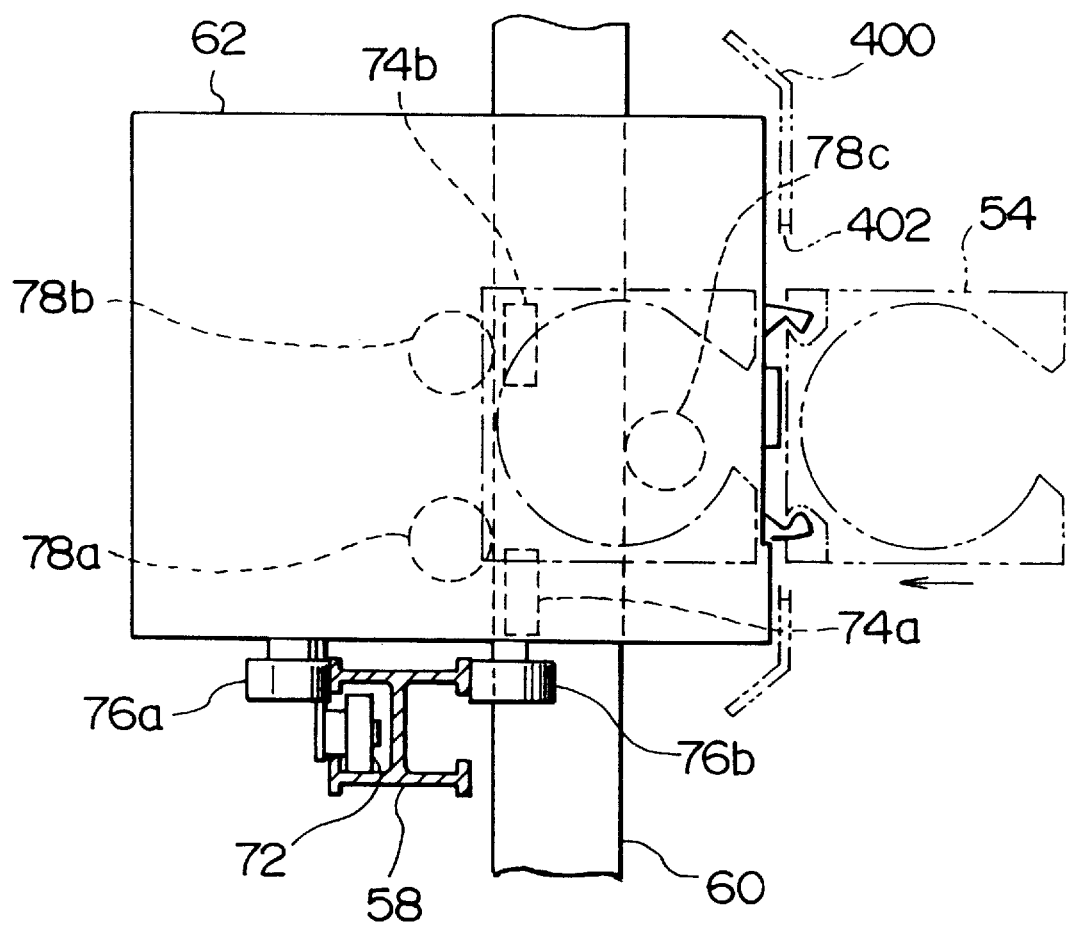
FIG. 5 is a right side view of the carrier in FIG. 3.
Figure 6:
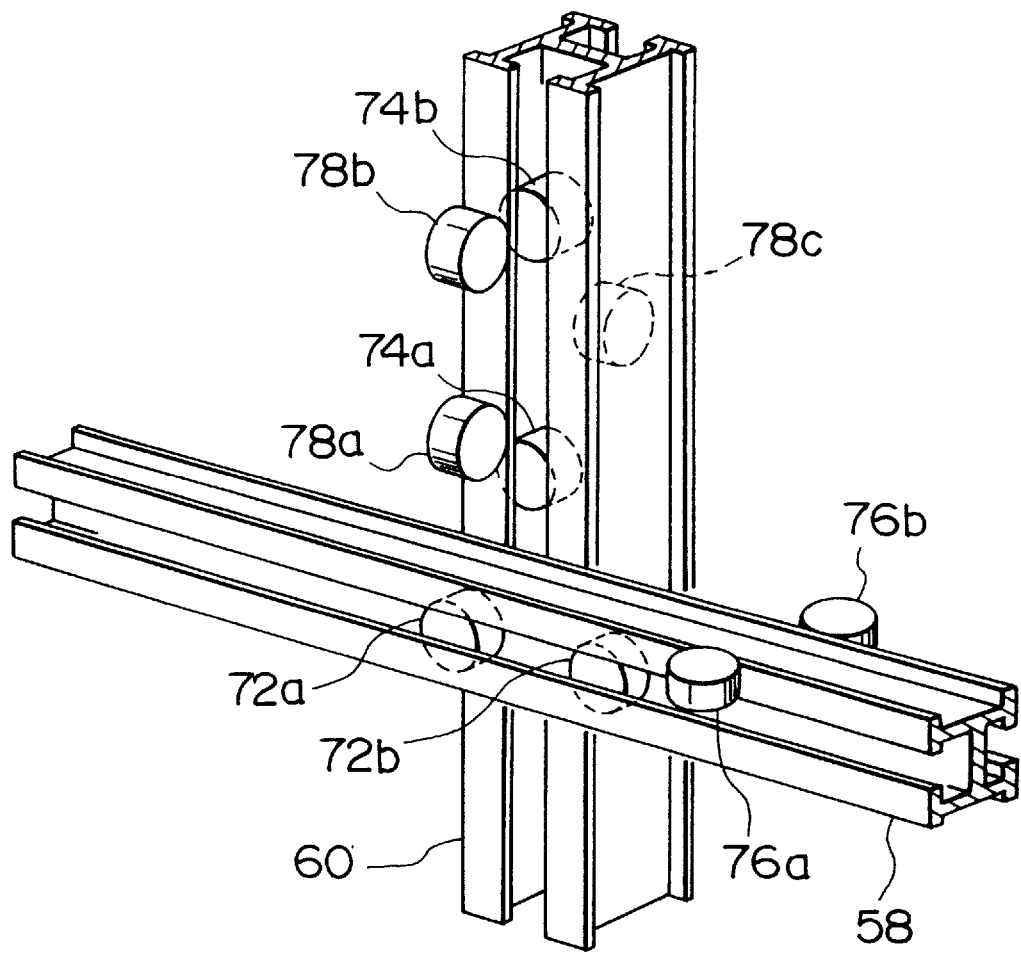
FIG. 6 is a perspective view illustrating an arrangement of guide rollers for guiding the carrier.

The carrier 62 is held near the intersection of the bars by nine guide rollers 72 to 78 as shown in FIGS. 3 to 6. As best seen in FIGS. 4 and 6, it would be apparent that the carrier 62 is placed on a plane consisting of the bars 58, 60 by rotating the two guide rollers 72 (72a, 72b) along the horizontal moving bar 58, and rotating the two guide roller 74 (74a, 74b) along the vertical moving bar 60.

Figure 7:
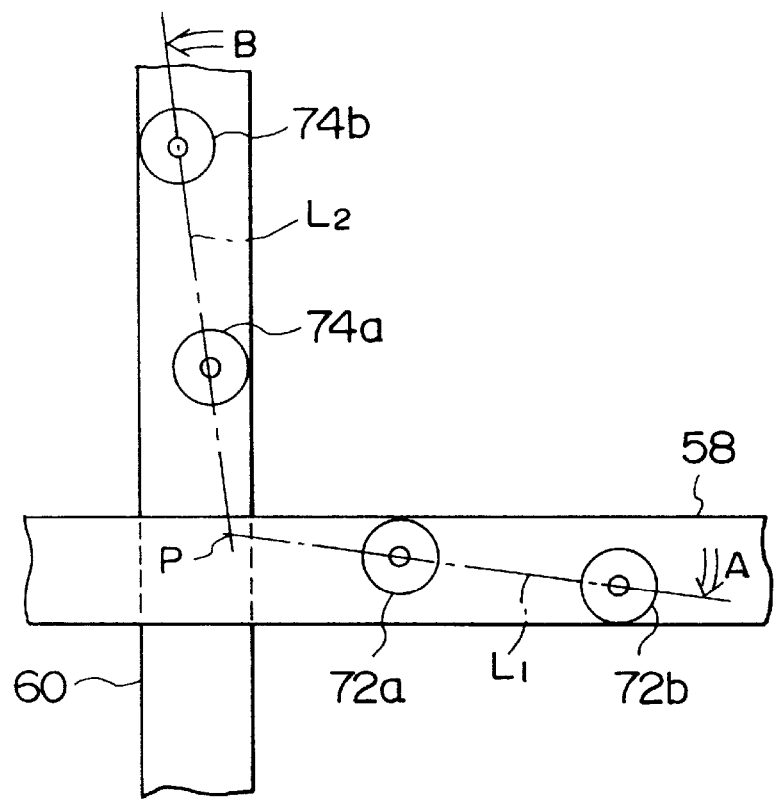
FIG. 7 is a front view showing an exemplary arrangement of the guide rollers for keeping the carrier stable to moving bars.
Figure 8:
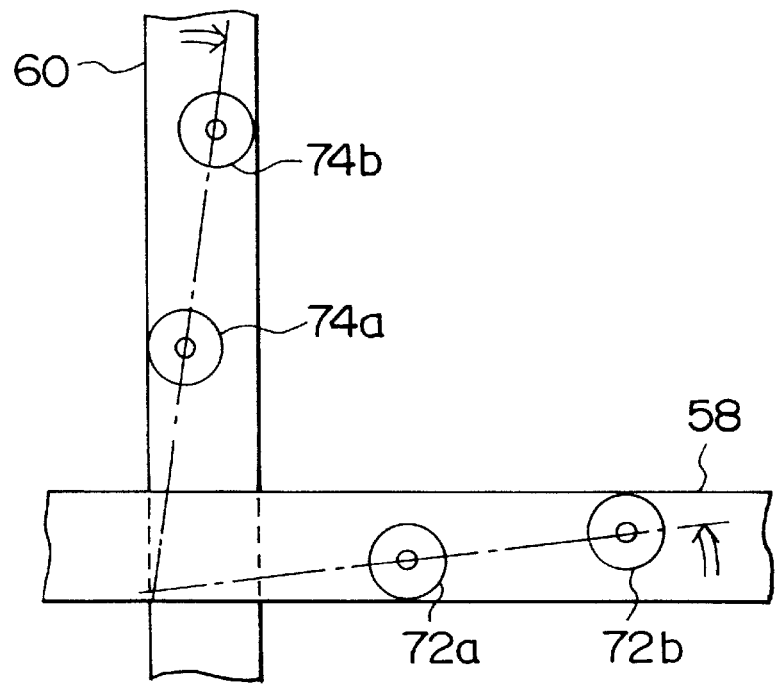
FIG. 8 is a front view showing another exemplary arrangement of the guide rollers for keeping the carrier stable to the moving bars.
Figure 9:
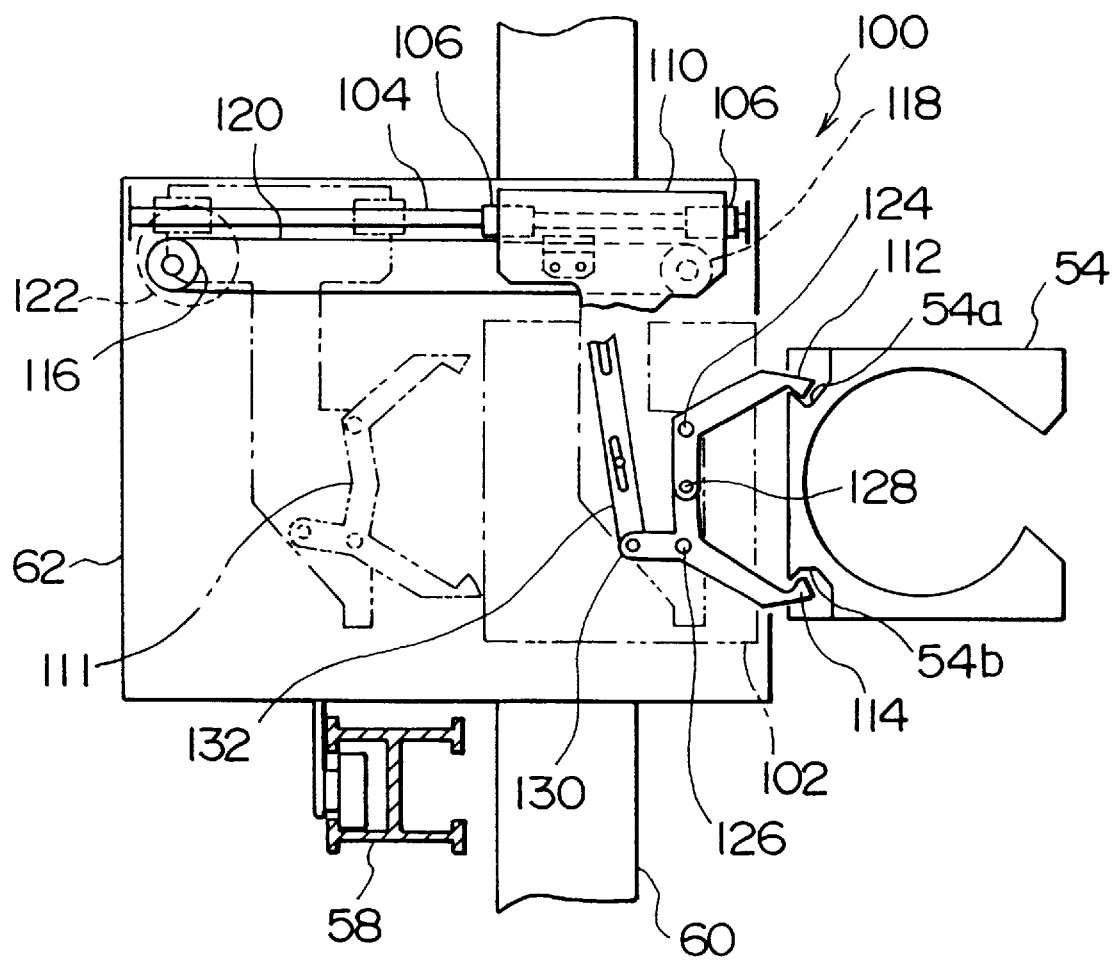
FIG. 9 is a right side view showing pick-up means of the carrier.
Figure 10:
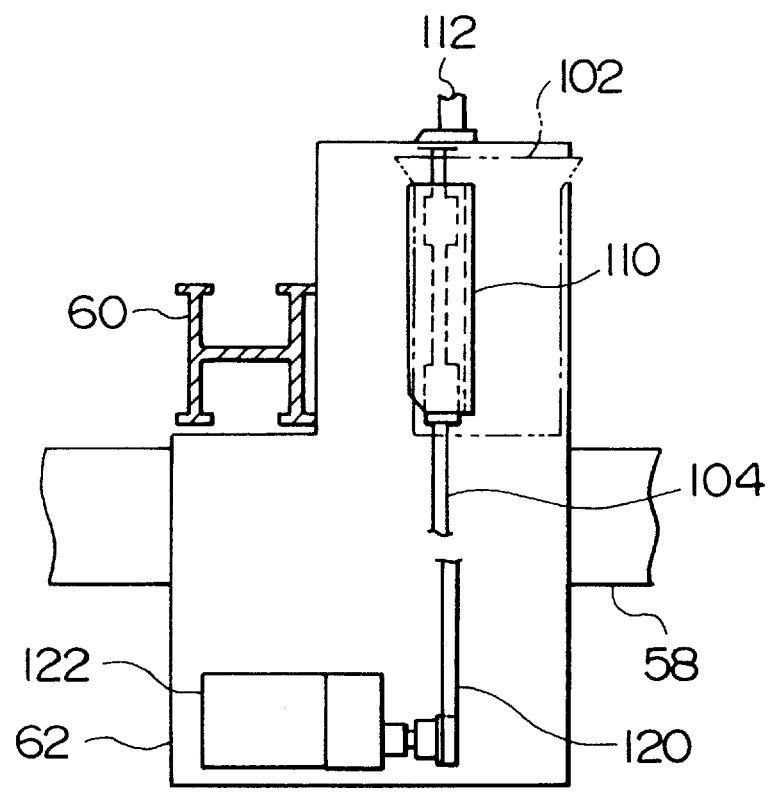
FIG. 10 is a plan view of the pick-up means in FIG. 9.

As shown in FIGS. 7 and 8, these guide rollers 72, 74 change their respective contacting sides on which the rollers travel, to restrict one-way rotation of the carrier 62. In the case of FIG. 7, the guide rollers 72a, 72b rotate touching the moving bar 58 to restrict the clockwise rotation of the carrier 62 (in the direction of the arrow A), whereas the guide rollers 74a, 74b rotate touching the moving bar 60 to restrict the counter-clockwise rotation of the carrier 62 (in the direction of the arrow B).

In FIG. 7, $L_1$ represents a straight line passing the centers of the guide rollers 72a, 72b, $L_2$ is a straight line passing the centers of the guide rollers 74a, 74b, and P is an intersecting point of the straight lines $L_1$, $L_2$. Since both the guide roller pairs 72, 74 are held by the carrier 62 and it is considered that the guide roller pairs 72, 74 are not relatively moved, the clockwise rotation of the carrier 62 (in the direction of the arrow A in FIG. 7) is restricted by the guide roller pair 72, whereas the counter-clockwise rotation of the carrier 62 (in the direction of arrow B in FIG. 7) is restricted by the guide roller pair 74. Accordingly, the carrier 62 is correctly put in position to the moving bars 58, 60 without idle motion at any time when the moving bars 58, 60 move with maintaining right angles to each other.

FIG. 8 shows another case in which each pair of the guide rollers 72, 74 is arranged to restrict the rotation of the carrier 62 in the direction opposite to the case of FIG. 7. Accordingly, the carrier 62 can be positioned correctly near the intersection of the moving bars 58, 60 without idle motion, as similar to the case of FIG. 7.

On the other hand, back and forth movement of the carrier 62, i.e., the movement of the carrier 62 across the plane consisting of the moving bars 58, 60 is restricted by guide rollers 76 (76a, 76b), which hold the horizontal moving bar 58 from the back and forth, and three guide rollers 78 (78a, 78b and 78c) which hold the vertical moving bar 60 from the back and forth.

Typical methods of holding the carrier 62 in place near the intersection of the moving bars 58, 60 need at least six guide rollers for each moving bar 58, 60 so that the carrier 62 can not be tilted, with respect to each of the moving bars 58, 60, on both planes, one consisting of the moving bars 58, 60 and the other being perpendicular to the plane. Specifically, two pairs of three guide rollers must be arranged for each moving bar 58, 60. Three rollers are arranged along one moving bar and in the plane consisting of the crossing two moving bars. Another three rollers are arranged along the one moving bar and in the vertical direction with respect to the plane consisting of the crossing two moving bars. As a result, the moving bars 58, 60 need twelve(12) guide rollers in total.

In contrast, the moving bars 58, 60 in the embodiment are engaged with the guide roller pairs 72, 74, respectively, taking advantage of the relationship between the moving bars 58, 60 which always intersect perpendicularly each other. It is therefore possible to largely reduce the number of guide rollers. In the embodiment, only the nine(9) guide rollers is required.

The horizontal and vertical moving bars 58, 60 are moved by the motors 68, 70 individually, and each moving amount of the moving bars 58, 60 is monitored by the carrying controller or MCU 20. This makes it possible to move the carrier 62 to a proper position. The cartridge shelves 52 and the scanner 16 are located within a movable range of the carrier 62. In the embodiment, the scanner 16 is placed in the right corner of the lower portion within the movable range of the carrier 62.

Prior to the carrying a target cartridge, the MCU 20 sends a command to the carrier 62 to determine whether there is a cartridge or cartridges 54 projecting from the storing shelves 52, the details being described later. That is, the carrier 62 confirms, before operation of carrying a cartridge 54, that no cartridge 54 projects.

The carrier 62 then picks up a desired cartridge 54 from a corresponding shelf 52, carries it to the scanner 16 and insert it into a cartridge loading port 16a. After the retrieval operation, the carrier 62 receives the cartridge 54 from the scanner 16 and returns it to the original or predetermined storing position in the shelves 52. During the carrying operation, the carrier 62 travels at a high speed.

On the other hand, the scanner 16 retrieves and reads an image or images recorded on the microfilm in the cartridge 54. The image read by the scanner 16 is stored in the memory 20A, and the image data is sent to the host computer 10. The host computer 10 processes the image data in a predetermined image processing and supplies the processed image data to the printer 14. Alternatively, the image data may be stored in other memory (not shown) such as a magneto-optical disk or output to other external equipment.

Structure of Carrier

The carrier 62 will be described below with reference to FIGS. 9 through 14. The carrier 62 includes one pick-up means or mechanism 100, a buffer 102 and a guide rod 104. The guide rod 104 is fixed in the upper portion within the casing of the carrier 62 horizontally in the back and forth direction, i.e., the direction to slide a cartridge 54 in and out from the storing shelves 52. The pick-up means 100 includes: two linear bearings 106, 106 slidably attached to the guide rod 104; a holder bracket 110 with the upper end fixed to the linear bearings 106, 106 and the lower end slidably engaged with one of grooves 108 of the buffer 102, described later; and claw or pawl members 112, 114 attached to the holder bracket 110. The claw members 112, 114 constitutes a gripper 111 for grasping the cartridge 54 by opening and closing the claw members 112, 114.

On the lower side of the guide rod 104, an endless belt 120 wound around a pair of pulleys 116, 118 extends in parallel to the guide rod 104. One pulley 116 is rotated in both directions by a gad motor 122 with a reduction gear therein. The holder bracket 110 is then fixed with the belt 120 between the pulleys 116, 118. When the motor 122 drives the belt 120 to run in any direction, the holder bracket 110 is guided by the belt 120 along the guide rod 104 to move back and forth. Alternatively, a wire may be used instead of the belt 120. In the embodiment, the gad motor 122 and the belt 120 constitute stroke driving means according to the invention.

The claw members 112, 114 of the gripper 111 have an L-like shape, respectively, with the center portions movably fixed by pins 124, 126 to the holder bracket 110 and one ends coupled to and engaged with each other through a pin 128 to move in opposite directions, respectively. The other ends of the claw members 112, 114 are shaped into a claw form which are engageable respectively with related concave or recess portions 54a and 54b on the end face of the cartridge 54.

One claw member 114 has an arm 130 which projects to the side opposite to the claw 114 and turns or moves radially on the pivot pin 126 so that the claws of the claw members 112, 114 can open or close vertically. The holder bracket 110 also holds a push plate 132 movable up and down, and the lower end of the push plate 132 is coupled to the arm 130. The push plate 132 is enforced by a spring (not shown) to return upwardly to the original position, and therefore the claw members 112, 114 are enforced to be opened. Above the upper end of the push plate 132, an angle member 134 with an L-shaped cross section is disposed in parallel to the guide rod 104. The angle member 134 corresponds to a rail member according to the present invention.

Figure 11:
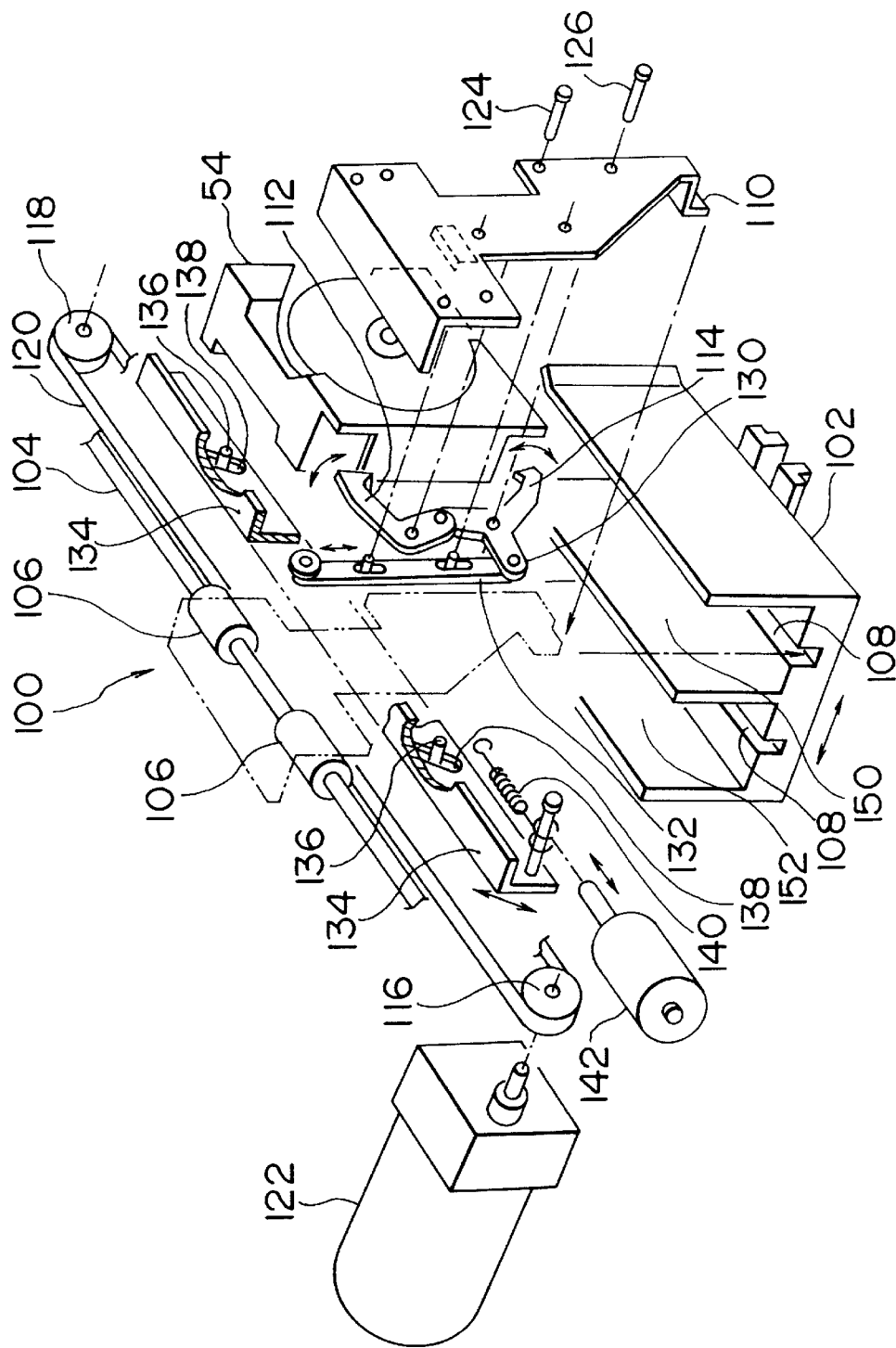
FIG. 11 is an exploded perspective view of the pick-up means in FIG. 9.

As shown in FIG. 11, the angle member 134 has slant grooves 138, 138 parallel to each other and engaged with at least two pins 136, 136 fixed to the casing of the carrier 62. The angle member 134 is forced by springs 140 on the right hand in FIG. 11, the springs 140 connected to the fixed pins 136, respectively. The pins 136 guide the grooves 138, 138 and push the angle member 134 diagonally or obliquely toward the upper side, so that the angle member 134 returns to the original position. On the other hand, an electromagnetic solenoid 142 pulls the angle member 134 in the opposite direction. At this time, the pins 136 guide the slant grooves 138 to move the angle member 134 diagonally to the lower side. The electro-magnetic solenoid 142 corresponds to claw opening/closing drive means according to the present invention. Alternatively, other power means such as an air cylinder may be used instead of the electromagnetic solenoid.

As discussed above, the angle member 134 is configured to move diagonally up and down. Then, rollers are attached to the upper end of the push plate 132, which rotate touching the horizontal lower face of the angle member 134. When the angle member 134 returns diagonally to the upper position, the push plate 132 rises by means of a spring, not shown, to open the claws of the claw members 112, 114, irrespective of location of the holder bracket 110 which lies within the range of the guide rod 104. When the angle member 134 is pulled due to excitation of the electromagnetic solenoid 142, the angle member 134 moves diagonally to the lower position, and therefore the push plate 132 is pushed down to close the claws of the claw members 112, 114.

Such claw opening/closing operation allows the claws to be engaged with or removed from the related concave portions 54a, 54b of the cartridge 54. In addition to the operation to open or close the claws, operation of the pick-up means 100 to be unitarily slid on the guide rod 104 allows cartridges 54 to be slid in and out between the storing shelf 52 and the buffer 102, or between the buffer 102 and the scanner 16.

Structure of Buffer

Figure 12:
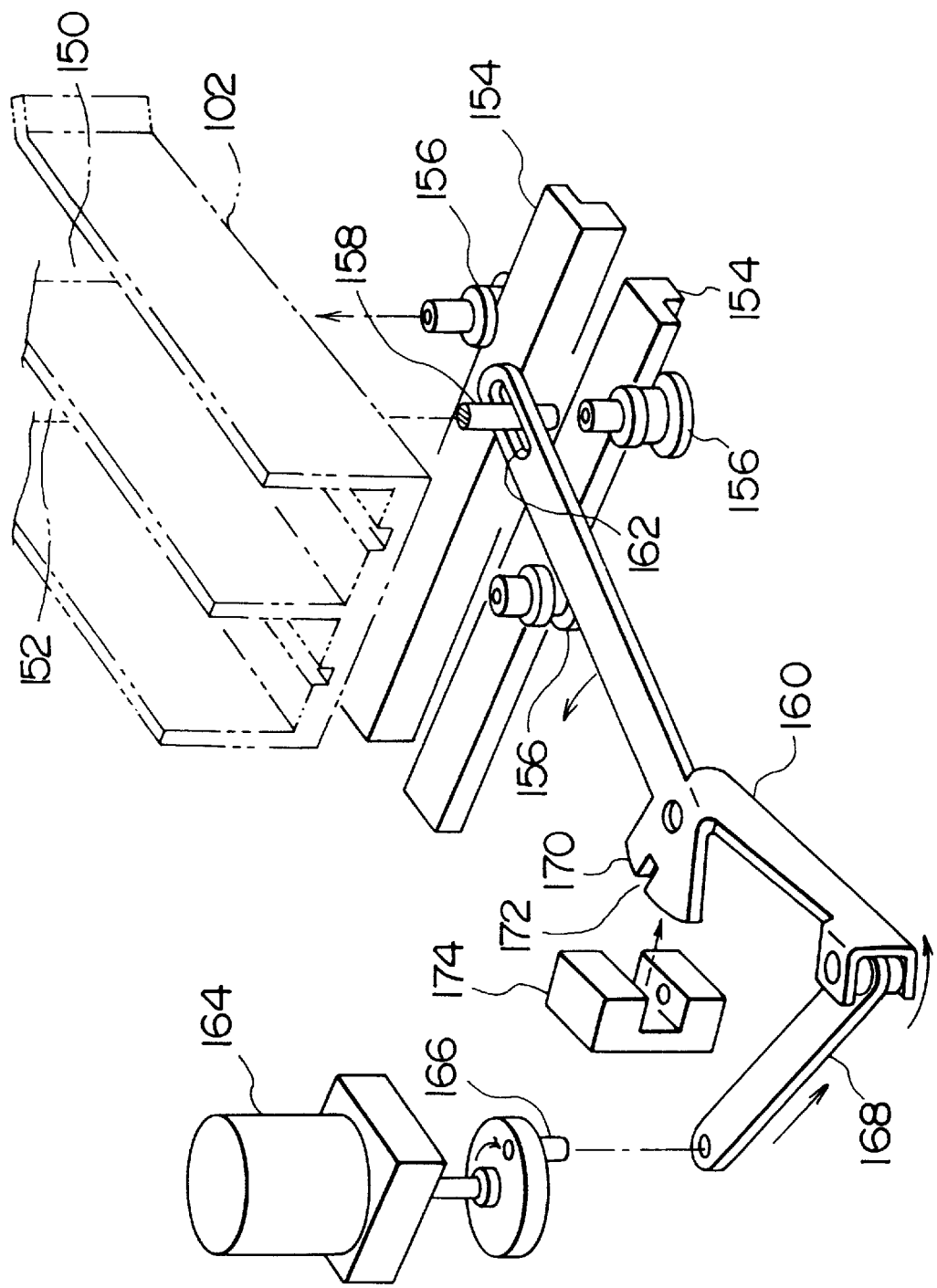
FIG. 12 is an exploded perspective view showing buffer switching means provided within the carrier.

The buffer 102 will be described below. As shown in FIGS. 11 and 12, the buffer 102 has capacity to store two cartridges 54 vertically and in parallel to the sliding direction of the pick-up means 100. Three guide rollers 156 are attached to the underside of the buffer 102. The guide rollers 156 rotate touching guide rails 154, which are fixed to the casing of the carrier 62 horizontally and perpendicularly to the sliding direction of the pick-up means 100. Further, a pin 158 is provided near the center of the underside of the buffer 102, as shown in FIG. 12. Represented by reference number 160 in FIG. 12 is a bell crank type driving lever, which is supported by the casing of the carrier 62 swingingly at a supporting point near the center thereof. The driving lever 160 has an elongated hole 162 at one end so that a pin 158 can be fitted in the hole 162. The other end of the driving lever 160 is then coupled through a link 168 to a crank pin 166 to be driven by a motor 164.

When the motor 164 runs in the direction of the arrow (clockwise) shown in FIG. 12, the link 168 is pushed in the direction of the arrows and the driving lever 160 on the elongated hole 162 side is rotated in the counter-clockwise direction. The buffer 102 is then moved to the left side as viewed from the plane in FIG. 14. Conversely, when the motor 164 runs counter-clockwise, the driving lever 160 is rotated clockwise and the buffer 102 is moved to the right as viewed from the plane in FIG. 13. At this time, the pick-up means 100 is set back from the buffer 102 to the outside (left side in FIG. 9) as indicated by the phantom line in FIG. 9. The pick-up means 100 is also set back to this phantom position when the carrier 62 is moved.

Accordingly, a buffer switching means or mechanism is constituted by the guide rail 154, the guide rollers 156, the pin 158, the driving lever 160, the link 168 and the motor 164.

The driving lever 160 also includes an arc shade 170 having a notch 172 and horizontally positioned near the supporting point. The notch 172 of the shade 170 is then detected by an photosensor 174, so that the position of the driving lever 160 can be detected, and hence the position of the buffer 102 can be detected.

Figure 13:
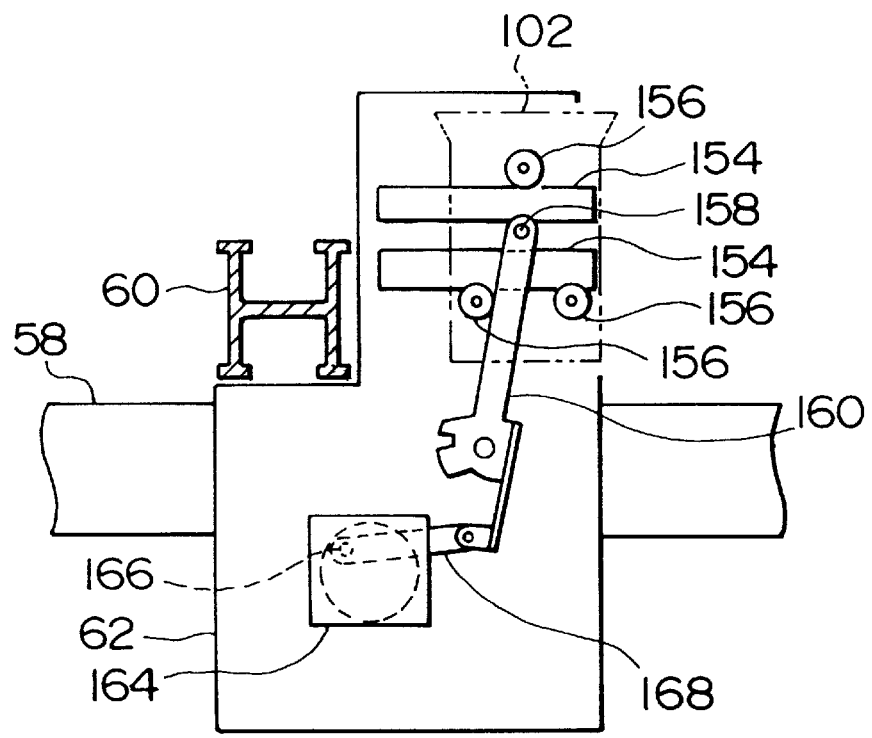
FIG. 13 is a plan view explaining operation of the buffer switching means, in which the buffer is shifted to the right hand.
Figure 14:
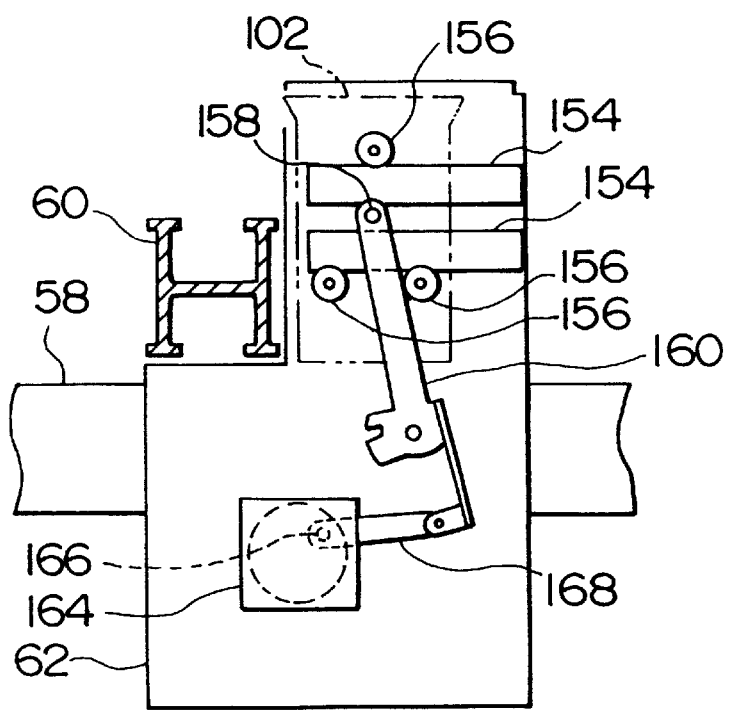
FIG. 14 is a plan view explaining operation of the buffer switching means, in which the buffer is shifted to the left hand.

The upper side of the buffer 102 is open so that the lower portion of the pick-up means 100 can enter compartments 150, 152. Specifically, the pick-up means 100 can enter the right compartment 150 when the buffer 102 is set on the left side (as shown in FIG. 14), or the left compartment 152 when the buffer 102 is set on the right side (as shown in FIG. 13).

As described above, the pick-up means 100 is slid in either of the compartments 150, 152 by engaging the lower end of the holder bracket 110 with the groove 108 on the bottom of each compartment 150, 152 and sliding thereon. The connection of the holder bracket 110 with the groove 108 prevents lateral swing of the pick-up means 100, and this makes it possible to precisely engage or remove the claw members 112, 114 with or from the related concave portions 54a, 54b of the cartridge 54.

Control of Carrier

Next, a description will be made to control of elements incorporated in the carrier 62 such as the pick-up means 100 and buffer switching mechanism. At first, a control mechanism for driving power of the carrier 62 such as the motors 122, 164 and the solenoid 142 will be described. The electric power can be supplied by using the moving bars 58, 60 as conductors isolated from each other.

In this case, at least one of the guide rollers 72, 74, 76 and 78 of the carrier 62 is a metallic roller through which the electric power can be from the moving bars 58, 60. The metallic roller may be replaced by contacts which slidingly contact the moving bars 58, 60. Further, the electric power may be supplied from two conducting rails by attaching such conducting rails to one of the moving bars 58, 60 so as to be isolated from each other and providing contacts in the carrier 62 to slidingly contact the conducting rails, respectively.

In above cases in which the moving bars 58, 60 are used for supplying the power, the carrier 62 preferably has a battery as a back-up power source. This is useful for avoiding inconvenience even when the power is interrupted for an instant due to the movement of the moving bars 58, 60.

Furthermore, the carrier 62 may have a battery enough to drive the carrier 62 without using the moving bars 58, 60 as conductors for the power source. In this case, there is no danger of cutting off the power source. The battery is preferably a secondary battery which can be charged repeatedly and automatically by connecting it to a charge terminal in a predetermined location during the idle time of the carrier 62.

Figure 15:
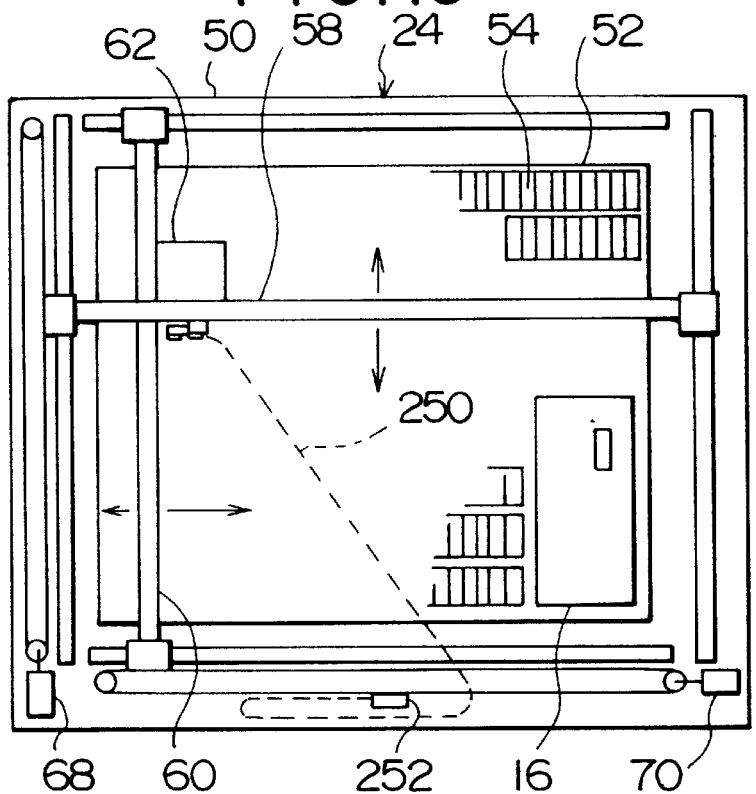
FIG. 15 is a schematic diagram explaining an example of wired serial communication between the carrier 62 and a controller MCU provided in a scanner 16.
Figure 16:
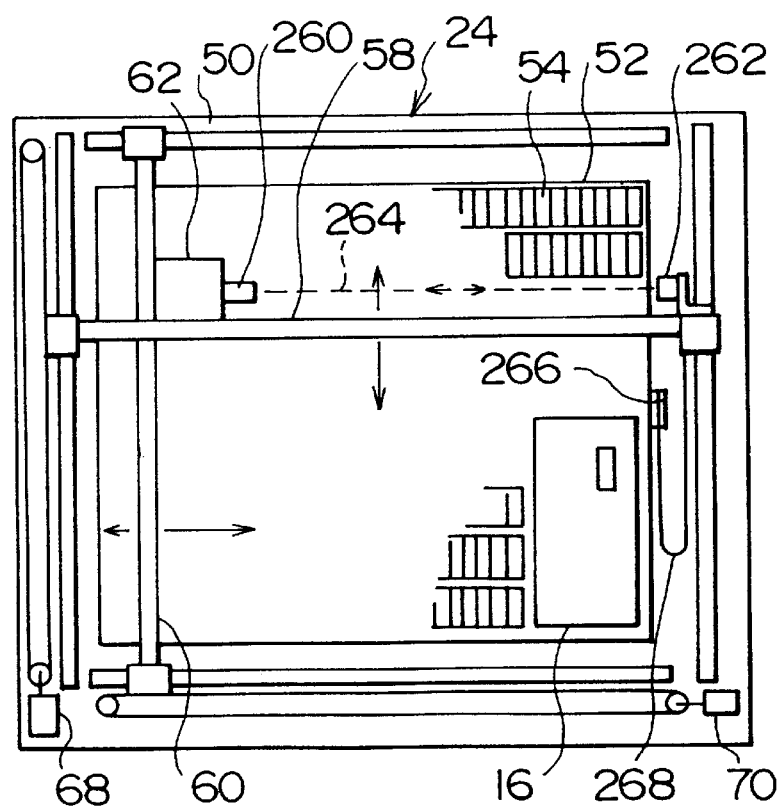
FIG. 16 is a schematic diagram explaining an example of optical serial communication between the carrier and the carrying controller MCU in the scanner.
Figure 17:
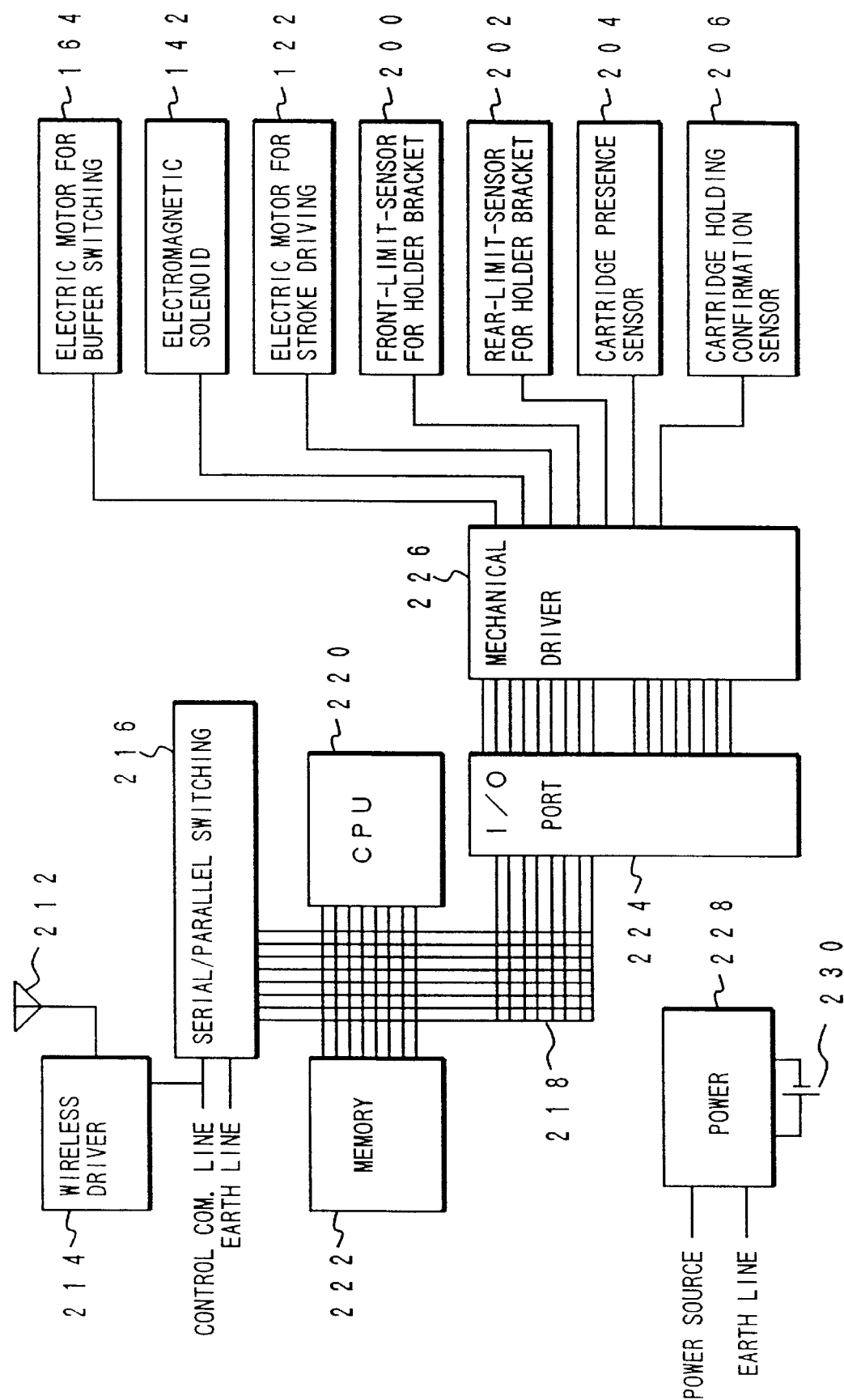
FIG. 17 is a block diagram showing an exemplary configuration of a control circuit in the carrier.

The power is supplied to the carrier 62 using one of such methods, while several control signals are exchanged between the carrier 62 and the MCU 20 of the scanner 16. FIG. 1 shows an exemplary system for sending and receiving such control signals. FIGS. 15 and 16 show other transmission systems, and FIG. 17 shows an exemplary configuration of a control circuit in the carrier 62.

The electric power is supplied, for example, to the motor 122 for moving the pick-up means 100 back and forth, the electromagnetic solenoid 142 for opening or closing the claw members 112, 114, and the motor 164 for switching the buffer 102. The control signals include several kinds of signals, such as command signals to be sent to these driving means 122, 142 and 164, and sensor signals to be sent from the carrier 62 to the MCU 20.

Several types of sensors are cited, such as a front-limit sensor 200 for the holder bracket (see FIG. 17) which detects a forward limit position of the holder bracket 110 in the pick-up means 100, a rear-limit sensor 202 for the holder bracket which detects a backward limit position of the holder bracket 110, a cartridge presence sensor 204 for determining whether there is a cartridge 54 in the forward direction of the pick-up means 100, and a cartridge holding confirmation sensor 206 for determining whether the cartridge 54 is held between the claw members 112, 114.

Such control signals are exchanged between the carrier 62 and the MCU 20 using wired or wireless serial communication. FIG. 1 shows an example of wireless communication. In FIG. 1, reference number 210 is an antenna for the carrier 62 and 212 is an antenna for the scanner 16.

The serial communication used herein is an information transmission technique for serially transmitting all bits of binary information on a single transmission line, which is often compared with parallel communication. Since multiple information is transmitted serially as binary information, when using wiring cords, the serial communication theoretically requires a minimum of two cords, but actually three signal lines including an earth line.

The use of the serial communication, of course, requires transmission means and reception means for the MCU 20 and the carrier 62, respectively. The transmission means converts the control signals into binary signals for serial transmission, while the reception means arranges the received serial signals in parallel and converts them into multivalued (analog) signals. In this example, since a wireless system is used for the serial communication, it is also necessary to provide wireless transmitter and receiver. The wireless system may be FM or AM type.

FIG. 17 shows an exemplary control circuit of the carrier 62, in which reference number 214 is a wireless driver which is used as a wireless transmitter/receiver. Reference number 216 is a serial/parallel converter which divides received serial signals into respective types of control signals for conversion into parallel signals. The converter 216 is connected through a bus 218 to a CPU 220, a memory 222 and an I/O port 224. The I/O port 224 is then connected to a mechanical driver 226.

Reference numeral 228 is a power supply circuit built into the carrier 62, which is connected to the moving bars 58, 60, respectively, one of the moving bars used as a power source and the other used as the earth line, for collecting electric current and producing a constant voltage using a constant voltage circuit. Reference number 230 is a battery used as a back-up power source which is provided for supplying a constant voltage continuously even when collection of the electric current is temporarily interrupted.

The CPU 220 detects the operating status of the system from outputs of respective sensors 200, 202, 204 and 206 and determines the next operation in accordance with an operation command input through the wireless communication from the MCU 20 of the scanner 16. The result of the determination is output through the I/O port 224 to the mechanical driver 226 which supplies the driving power to respective driving elements such as the motors 164, 122 and the solenoid 142.

FIG. 15 shows another type of serial communication of wired type using electric wiring 250. In FIG. 15, reference numeral 252 is a connector mounted near the center of the lower portion of the shelves 52. The lower end of the wiring 250 is connected to the connector 252; the upper end of wiring 250 is connected to the carrier 62. The wiring 250 used herein consists of two or three wiring cords relatively thin and light, so that the carrier 62 can move at a high speed without obstruction.

FIG. 16 shows exemplary optical communication, in which the reference numeral 260 is a light emitting/receiving unit attached to the carrier 62, the reference numeral 262 is another light emitting/receiving unit attached to one end of the moving bar 58. These light emitting/receiving units 260, 262 exchange serial signals therebetween by outputting beams of infrared light in parallel to the moving bar 58. The light emitting/receiving unit 262 of the moving bar 58 is connected through wiring 268 to a connector 266 provided on the shelves 52 side. The connector 266 is then connected to the MCU 20 of the scanner 16.

The light emitting/receiving unit may be directly attached to the scanner 16. In this case, however, the serial communication must be maintained securely throughout the movable range or travelling area of the carrier 62. To secure the serial communication, several measures should be taken, such as to adequately broaden the emitting range of the infrared light or to change light emitting/receiving directions of the light emitting/receiving units according to the movement of the carrier 62. Optical communication may be also applied to the connection between the light emitting/receiving unit 262 and the connector 266 (for the scanner 16) instead of the wiring 268.

Detection of Projecting Cartridge

Next, a description will be made to operation of detecting a projecting cartridge. The MCU 20 checks whether all the cartridges 54 are stored correctly in the shelves 52, based on power-on operation of the power source switch, before a target cartridge is taken out from a corresponding shelf 52 and is carried or delivered to the scanner 16.

Figure 18:
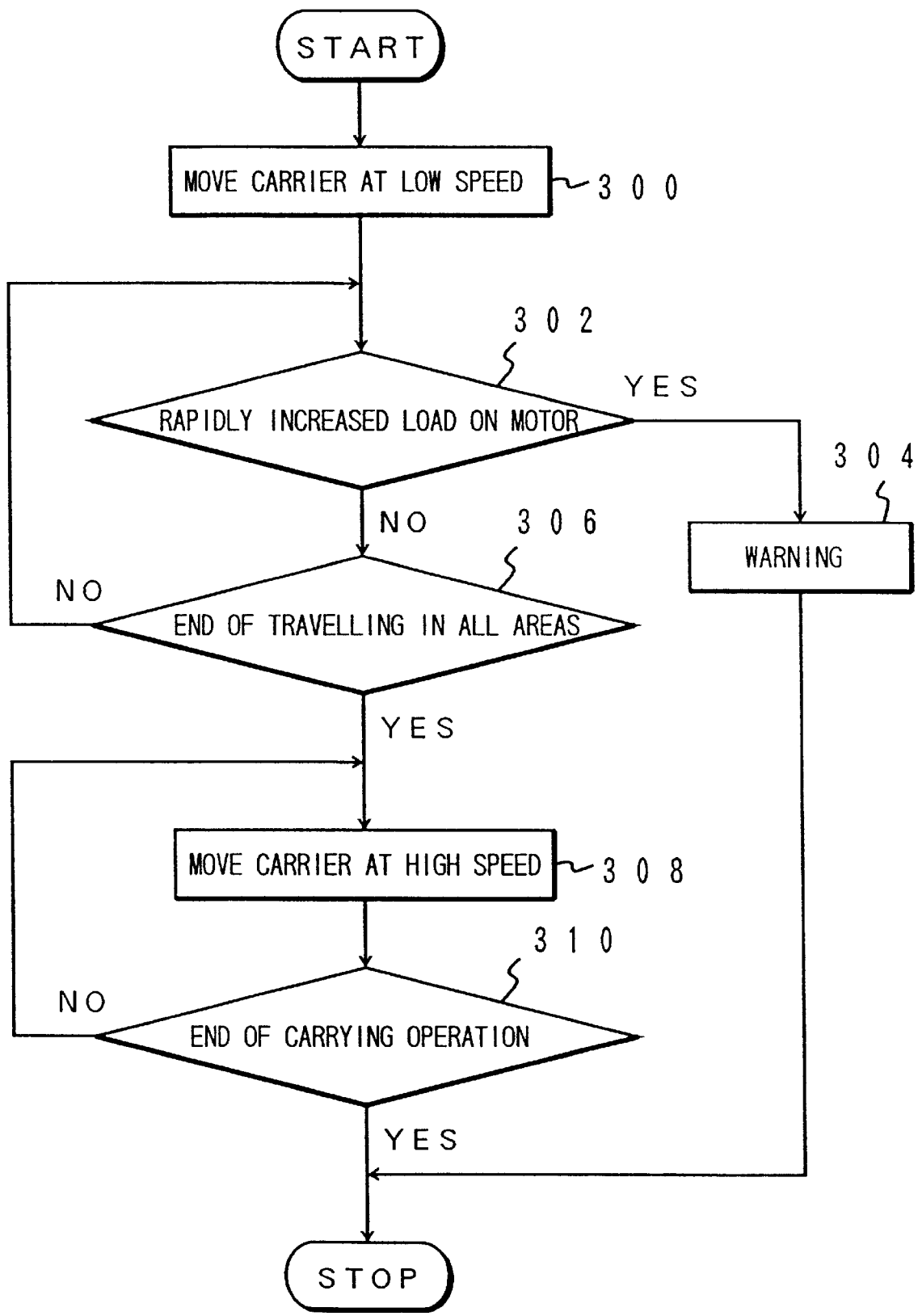
FIG. 18 is a flowchart explaining operation of the cartridge carrying device.

For this purpose, the MCU 20 drives the carrier 62 to travel or be swept in a plane facing and covering the entire front area of the storage shelves 52 at a low speed (step 300 in FIG. 18). In other words, the carrier 62 travels in the front area of the shelves 52 at such a speed as the carrier 62 would never damage even if it hits the projecting cartridge 54, for example, at a speed of approximately $\frac{1}{10}$ (approx. 50 mm/sec) of the normal, high-speed carrying speed (approx. 600 mm/sec).

As an example, the carrier 62 starts traveling upwardly from the position opposite to a cartridge 54 placed in the lower left hand corner of the storage shelves 52. When the carrier reaches the upper end, it shifts by a cartridge's width to the right, then, the carrier 62 repeats up and down movement. During this operation, if a cartridge 54 projects from the shelf 52, the carrier 62 will come into contact with the cartridge 54 to stop (step 302 in FIG. 18). As a result, the load on the motor 68 or 70 for moving the carrier 62 rapidly increases. The rapid increase in load can be detected from an increase of the current flowing through the motor 68 or 70. Alternatively, an encoder for detecting the number of revolutions of the motors 68, 70 may be used to detect the increase in load from the fact that the encoder keeps its output unchanged.

When detecting a projecting or protruding cartridge 54, the MCU 20 sends a warning signal to the host computer 10. Then, the host computer 10 activates a warning device 10A (FIG. 2) to notify the operator that a cartridge 54 projects from the shelf 52 (step 304 in FIG. 18).

After moving the carrier 62 in entire front area of the storage shelves at the low speed, if no projecting cartridge 54 is detected (step 306 in FIG. 18), the carrier 62 initiates original carrying operation (step 308). In the carrying operation, the carrier 62 travels at the high speed to carry a target cartridge 54 to the scanner 16 and to carry back the cartridge 54 to the original position of the shelves 52 (step 310) after an image or images recorded on the film in the cartridge 54 have been retrieved.

Carrying Operation of Carrier

The carrying operation will be described below. At first, the MCU 20 actuates the carrier 62 to move at the high speed to the front of a cartridge 54 to be selected from one of the shelves 52. At this time, the buffer 102 may be set on the left hand position or the right hand position. The pick-up means 110 is set back from the buffer 102.

When the carrier 62 reaches the position where the target cartridge 54 is located, the MCU 20 sends control signals through a serial communication network and instructs the carrier 62 to execute several operation. The MCU 20 first moves forward the pick-up means 100 through one of the compartments, e.g., the compartment 150 to engage its claw members 112, 114 with the cartridge 54 stored in the shelves 52. At this time, the claw members 112, 114 may be temporarily opened by changing the electromagnetic solenoid 142 to be non-excited state, or by pressing the claws to the cartridge 54.

The electromagnetic solenoid 142 is then excited to close the claw members 112, 114 and moves backward the pick-up means 100 so that the cartridge 54 will be put in the compartment 150. After that, the MCU 20 moves, at the high speed, the carrier 62 to the front of a cartridge loading port 16a of the scanner 16, and moves forward the pick-up means 100 to push out the cartridge 54 stored within the compartment 150 into the cartridge loading port 16a. The electromagnetic solenoid 142 is made non-excited again to open the claws and moves backward the pick-up means 100.

The scanner 16 executes predetermined processings such as retrieval of the loaded cartridge 54 and reading of an image or images. During the series of processings, the carrier 62 moves to a position where the next or second cartridge 54 is located and slides the cartridge 54 into one of the compartments, e.g., the compartment 150. When the second cartridge 54 is taken out and slid in the compartment 150, the pick-up means 100 opens its claws to release the cartridge 54 therefrom. After that, only the pick-up means 100 moves further backward to exit the buffer 102.

In this condition, the carrier 62 returns to the position facing to the cartridge loading port 16a of the scanner 16. During this operation, the buffer 102 is slid to the opposite side by the motor 164. In the embodiment, the buffer 102 moves to the right side to shift the empty compartment 152 to the front of the pick-up means 100. After the scanner 16 finishes processing the cartridge 54, the pick-up means 100 moves forward through the empty compartment 152 to pull out the processed cartridge 54 from the cartridge loading port 16a into the compartment 152. After that, the pick-up means 100 releases the cartridge 54 from the claw members 112, 114, moves further backward and exits the buffer 102.

When the pick-up means 100 sets back from the buffer 102, the buffer 102 is slid again to the opposite side to shift the compartment 150, in which the next or second cartridge is stored, to the front of the pick-up means 100. The pick-up means 100 then moves forward into the compartment 150 to push out the second cartridge 54 into the cartridge loading port 16a while holding it between the claw members 112, 114. After the pick-up means 100 is set back, the carrier returns to carry back the processed cartridge 54, which is currently stored in the compartment 152, to a position of the shelves 52 to which the processed cartridge should be returned, at high speed. During the carrier returns, the buffer 102 is switched to shift the compartment 152 to the front of the pick-up means 100.

As described the above, while one cartridge 54 is being processed by the scanner 16, the other (next) cartridge 54 is put in the carrier 62 and placed into position near the scanner 16. After end of processings in the scanner 16, the processed cartridge 54 is slid in the empty compartment 150 or 152 within the carrier 62, and the buffer 102 is then switched to supply the next cartridge 54 immediately to the scanner 16. This makes it possible to speed up the exchange of the cartridges 54 between the carrier 62 and the scanner 16.

It should be noted that the stroke driving means (including the endless belt 120, the pulleys 116, 118 and the motor 122) and the claw opening/closing drive means (including the electromagnetic solenoid 142) are mounted on the casing side of the carrier 62. For this reason, the movable portion which moves back and forth together with the holder bracket 110 and the claw members 112, 114 can be made lighter in weight. There is also no need to connect an electric wiring cord or cords to the movable portion.

Although no electric wiring is required for the movable portion (i.e., for the pick-up means 100), if a sensor is provided near the claw members 112, 114 for detecting that the cartridge 54 is held or released from the claws, the wiring cord will need to be connected to the movable portion. Even in this case, the wiring cord can be made thin and light enough, which is different from that used to drive the motor or plunger.

It is therefore possible to speed up a stroke (back and forth movement) of the holder bracket 110. Further, no wiring cord needs to be connected to the holder bracket 110 or the wiring cord can be made thinner and lighter, so that the possibility of broken wire can be eliminated or remarkably reduced.

Furthermore, since the exchange of the control signals between the carrier 62 and the MCU 20 is made through a serial communication network, the carrier 62 and the MCU 20 can be connected by wiring 250 lightened in weight (FIG. 15). If the serial communication used herein is wireless type (FIG. 1) or optical type (FIG. 16), such wiring does not need to be provided between the carrier 62 and the MCU 20. This allows the carrier 62 to move at a higher speed. As shown in FIG. 15, although the wiring 250 is used to supply electric power from the moving bars, an individual power-source line may be unitarily connected to the wiring 250.

Other Embodiments

In the above embodiments, a distance between the carrier 62 and the microfilm cartridges 54 stored in the shelves 52 is very narrow, typically 5 mm or so. It is therefore convenient to push back the projecting cartridge 54 into the normal position using the carrier 62 when the projecting amount of the cartridge 54 is small enough.

Figure 19:
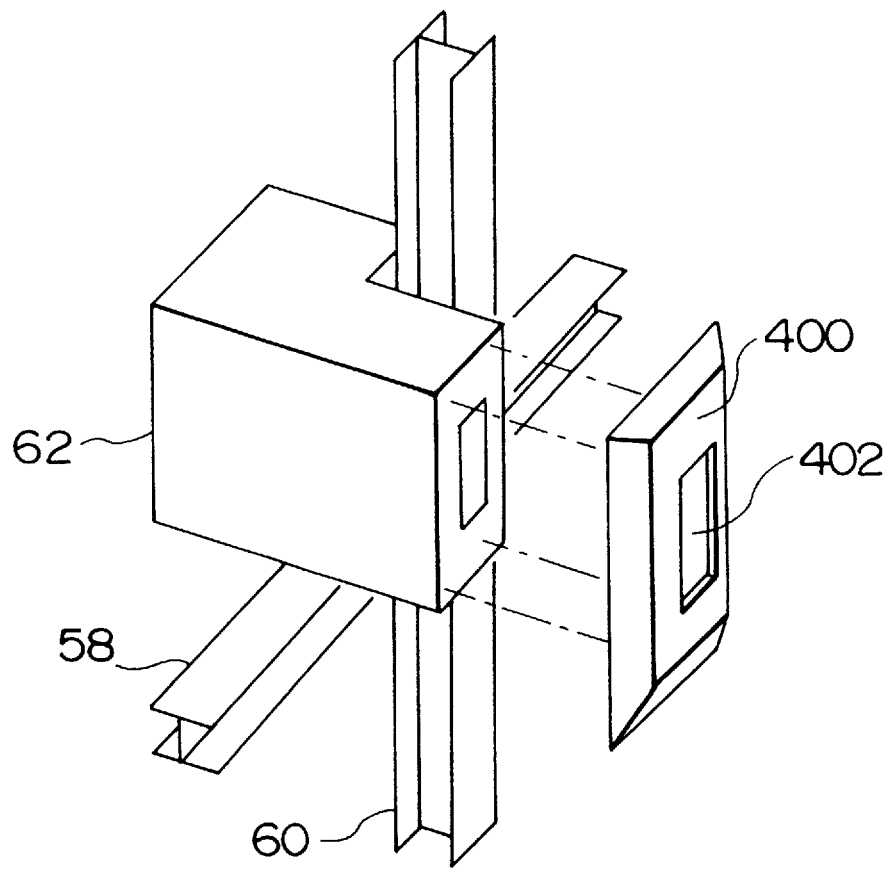
FIG. 19 is a perspective view showing a push plate attached to the front of the carrier for pushing back a cartridge into a shelf.

FIG. 19 is a perspective view showing a push plate 400 which is used to push back the cartridge 54. The push plate 400 is attached to the front side of the carrier 62, i.e., it is attached to the side facing to the cartridge 54, with the outer edge inclined to be shaped into a form like a rectangular dish. The push plate 400, of course, has a window 402 through which the cartridge 54 passes together with the claw members 112, 114. The push plate 400 is also shown in FIGS. 3 and 5 with phantom lines.

If the projecting amount of the cartridge 54 is small enough, the carrier 62 with the push plate 400 attached will be moved to push back the projecting cartridge 54 into the shelf 52 while applying the inclined edge of the push plate 400 to the cartridge 54. This makes it possible to enter into the carrying operation without warning or interruption when the projecting amount of the cartridge 54 is small enough, and hence to speed up the processing.

Figure 20:
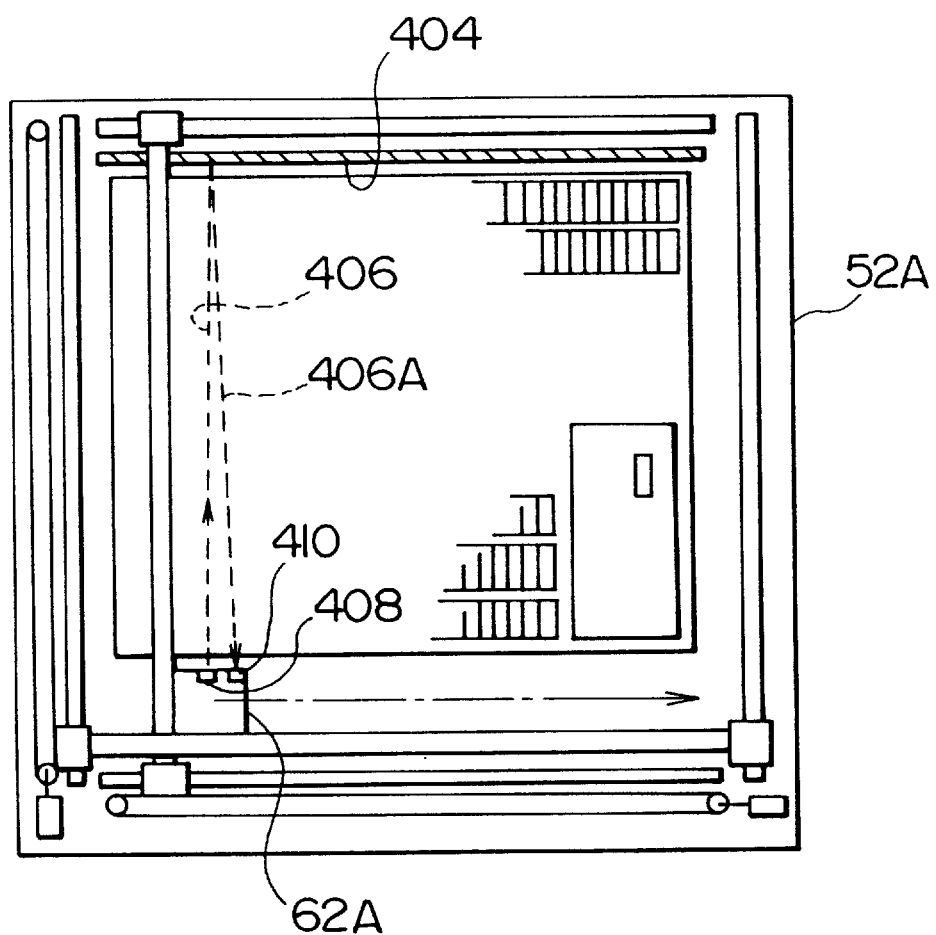
FIG. 20 is a front view showing storing shelves of a carrying device according to other embodiment of the present invention.

FIG. 20 is a front side view of shelves 52A showing still another embodiment of the present invention. In the upper portion of the shelves 52A, a reflector 404 is arranged horizontally to project slightly forward (toward the carrier 62A) from the front face of the cartridge 54. The carrier 62A is, on the other hand, provided with a light-emitting element 408 for emitting a light beam 406 upwardly and in the substantially vertical direction, and a sensor 410 for detecting reflected light 406A of the light beam 406 reflected by the reflector 404.

The carrier 62A starts moving horizontally across the lowest portion of the shelves 52A with the power-on of the power-source switch. During this time, the light-emitting element 408 emits the light beam 406 upwardly and the sensor 410 senses the light beam 406A reflected by the reflector 404. If a projecting cartridge 54 enters the path of the light beam 406, the light beam incident on the sensor 410 is interrupted and therefore the projecting cartridge 54 can be sensed.

Although the above embodiments described carrying systems for carrying microfilm cartridges, the present invention is not limited by such a type of material or item and may be applied to other shelves for storing other type of material such as videotape cassette, video disk or compact disk. Further, the buffer may be either slid up and down or rotated depending on the shape of the shelves.

As described above, according to the present invention, the carrier is provided with the holder bracket movable back and forth, in which the claw members is held to be engaged with or removed from a material, and the stroke driving means for moving the holder bracket back and forth and the claw opening/closing drive means for opening or closing the claws are attached to the casing of the carrier. For this reason, the movable portion (i.e., the pick-up means) which moves together with the holder bracket can be made lighter in weight. Further, the electric wiring cord to be connected to the movable portion can be eliminated or made thin and light enough. This allows the movable portion (pick-up means) to move at a high speed.

The stroke driving means, for example, consists of an endless belt attached to the casing of the carrier, and an electric motor for driving the belt. In this case, the belt is stretched in parallel to the guide rod and coupled to the holder bracket. The holder bracket has upper and lower ends, the upper end held by the guide rod and the lower end engaged with the guide groove on the bottom of the compartment. With this construction, lateral swing of the holder bracket can be prevented and this allows the claw members to catch and release the material precisely.

The buffer can include a plurality of the compartments to be changed from one to another by switching the buffer, thus improving the efficiency of carrying the materials.

In the carrying device and method according to the present invention, the carrier is held at the intersection of a pair of moving bars which moves in parallel, respectively, with maintaining angles (preferably right angles) to each other, and moved to a target position by moving both the moving bars. Accordingly, the motor for driving the moving bars needs to be provided on the shelves side, but the motor for driving the carrier can be eliminated from the carrier side, so that the movable portion which moves together with the carrier can be made lighter in weight, thereby carrying out a compactimization of the motor.

Further, since the exchange of the control signals between the carrier and the carrying controller (e.g., MCU) is made by the serial communication, the wiring therebetween can be made lighter in weight. If the control signals are transmitted by wireless (radio) or optical communication, no wiring may be required. Since such types of communication systems further reduce resistance to the movement of the carrier, they are more suitable for high-speed movement of the carrier.

Although the driving power for the carrier is supplied from the moving bars, a battery can be built in the carrier. In this case, no wiring is required between the carrier and the controller except for the serial communication of the control signals. It is therefore possible to lighten the wiring therebetween, or to eliminate even the wiring of serial communication if the control signals are transmitted with a wireless (radio) or optical communication system. Such types of communication systems are more suitable for high-speed movement of the carrier.

Furthermore, according to the control method for the carrying device of the present invention, before carrying operation of carrying the material, it is confirmed that no material projects from the shelves, and if there is a projecting material, a warning is given to the operator to discontinue the following carrying operation and to return the projecting material to the correct position, so that the possibility of damage to the carrier or the material can be eliminated.

For example, the projecting material is detected by moving the carrier at a low speed so as to touch the projecting material. Such detection can be implemented by a computer using only software elements without adding special parts, so that the mechanical assembly can be simplified.

Alternatively, a light beam may be used to detect the projecting material by emitting the light beam across the front of the shelves in the vertical or lateral direction so as to enter the path of the light beam if the material projects from the shelves.

What is claimed is:

1. A carrying device having a carrier which pulls out and carries a target material from one of shelves to a target position, the shelves storing a plurality of materials, and which carries back the target material from the target position to the shelf, said carrier comprising:
   (a) a guide rod fixed to a casing of said carrier in parallel to a direction to slide said target material in and out;
   (b) pick-up means including,
      (1) a holder bracket slidably held by said guide rod,
      (2) a gripper having claw members for grasping the target material by opening and closing the claw members, said gripper means being held by said holder bracket, and (3) a push member one end of which is held by said holder bracket, said push member being movable to push said gripper so that said claw members can be opened to engage the target material or closed to remove the target material;

(c) a rail member provided in the casing of said carrier in parallel to said guide rod and horizontally movable in a direction nonparallel to that of said guide rod, on which one end of said push member is slid and pushed to open or close said claw members as the rail member moves;

(d) stroke driving means attached to the casing of said carrier for moving said holder bracket over said guide rod; and (e) claw opening/closing drive means attached to the casing of said carrier for moving said rail member horizontally in a direction nonparallel to that of said guide rod to open or close said claw members.

2. The device according to claim 1, wherein said stroke driving means includes an endless belt stretched in parallel to said guide rod and coupled to said holder bracket, and a motor for rotating one of pulleys around which the endless belt is wound.

3. The device according to claim 1, wherein said carrier further comprising at least one compartment for temporarily storing said target material, with a guide groove formed on the bottom of the compartment in parallel to said guide rod, said guide rod is arranged in the upper portion within the casing of said carrier, and said holder bracket has upper and lower ends, with the upper end held slidably on said guide rod and the lower end engagedly put in said guide groove.

4. The device according to claim 1, wherein said carrier further comprising:

a buffer having a plurality of compartments for temporarily storing said materials, the compartments arranged in parallel to a direction to intersect perpendicularly to the direction to slide materials in and out so that the compartments can be moved in the arranged direction;

buffer switching means provided in the casing of said carrier for moving said buffer in the direction to arrange the compartments and switching from one compartment to another where said pick-up means slides said material in and out, and said carrying device further comprising a controller for switching said buffer in the condition that said holder bracket exits the compartment of said buffer.

5. The device according to claim 4, wherein a guide groove is formed on the bottom of each compartment in parallel to said guide rod;

said guide rod is arranged in the upper portion within the casing of said carrier; and said holder bracket has upper and lower ends, with the upper end held slidably on said guide rod and the lower end engagedly put in said guide groove when said holder bracket enters the compartment.

* * * * *